(12) United States Patent
Molitor et al.

(10) Patent No.: US 7,424,355 B2
(45) Date of Patent: Sep. 9, 2008

(54) METHOD FOR OPERATING AND ELECTRICALLY ADJUSTABLE VEHICLE SEAT

(75) Inventors: Patrik Molitor, Eutingen (DE); Karl Schweizer, Radolfzell (DE)

(73) Assignee: Daimlerchrysler AG, Stuttgart (DE)

( * ) Notice: Subject to any disclaimer, the term of this patent is extended or adjusted under 35 U.S.C. 154(b) by 51 days.

(21) Appl. No.: 11/417,166

(22) Filed: May 4, 2006

(65) Prior Publication Data

US 2007/0012502 A1    Jan. 18, 2007

(30) Foreign Application Priority Data

May 4, 2005    (DE) .................. 10 2005 020 817
May 4, 2005    (DE) .................. 10 2005 020 818

(51) Int. Cl.
    *B60R 21/015*    (2006.01)
(52) U.S. Cl. .................. 701/45; 180/273; 280/735; 177/136; 177/144
(58) Field of Classification Search .................. 180/273; 280/735; 701/45; 177/136, 144
    See application file for complete search history.

(56) References Cited

U.S. PATENT DOCUMENTS

| | | | |
|---|---|---|---|
| 5,748,473 A * | 5/1998 | Breed et al. | 701/45 |
| 6,240,352 B1 * | 5/2001 | McCurdy | 701/45 |
| 6,253,134 B1 * | 6/2001 | Breed et al. | 701/49 |
| 6,299,250 B1 | 10/2001 | Orizaris et al. | |
| 6,323,444 B1 | 11/2001 | Aoki | |
| 6,330,501 B1 * | 12/2001 | Breed et al. | 701/49 |
| 6,555,766 B2 * | 4/2003 | Breed et al. | 177/144 |
| 6,784,379 B2 * | 8/2004 | Breed et al. | 177/144 |
| 2005/0248136 A1 * | 11/2005 | Breed et al. | |
| 2007/0158116 A1 * | 7/2007 | Peppler | |

FOREIGN PATENT DOCUMENTS

| | | |
|---|---|---|
| DE | 42 37 072 C1 | 12/1993 |
| DE | 100 11 372 A1 | 9/2000 |
| DE | 199 34 472 A1 | 2/2001 |
| DE | 102 49 960 A1 | 5/2004 |

* cited by examiner

*Primary Examiner*—Randy W Gibson
(74) *Attorney, Agent, or Firm*—Crowell & Moring LLP

(57) ABSTRACT

In a method for operating an electrically adjustable vehicle seat which has at least one electrically adjustable upholstered seat element and a sitting weight measuring device for sensing the weight of a vehicle occupant sitting on the vehicle seat, prior to an initial sensing of the weight by the sitting weight measuring device, the upholstered seat element is automatically moved into a measuring position. An adjustment range of the upholstered seat element is predefined as a function of the current sensed weight value.

21 Claims, 2 Drawing Sheets

METHOD FOR OPERATING AND ELECTRICALLY ADJUSTABLE VEHICLE SEAT

BACKGROUND AND SUMMARY OF THE INVENTION

This application claims the priority of German patent document DE 10 2005 020 818.5, filed Apr. 5, 2004 and German patent document DE 10 2005 020 817.7, filed Apr. 5, 2004, the disclosures of which are expressly incorporated by reference herein.

The present invention relates to a method for operating an electrically adjustable vehicle seat.

German patent document DE 199 34 472 A1 discloses a vehicle seat with adjustable contours and a backrest having air cushions arranged one on top of the other for forming a contour for the hollow of the back. A control device is provided for controlling the inflation pressure in the air cushions, and an operator control unit is connected to the control device for setting the inflation pressure.

German patent document DE 42 37 072 C1 describes a resistive film pressure sensor which is embodied as a sensor mat for detecting the occupation of a seat. The film pressure sensor outputs an analog signal which is indicative of the normal force which acts on its surface, and can be used to form a rough interrogation of the weight resting on the seat. It is thus possible to define a lower limiting value below which triggering of an airbag is suppressed. (It is assumed that when the weight is less than the limiting value the seat is not occupied.)

Furthermore, German patent document DE 100 11 372 A1 discloses a sitting weight measuring device for measuring the sitting weight on a vehicle seat, the sitting weight also including the weight of a vehicle occupant sitting on the vehicle seat. The sitting weight measuring device has a plurality of load cells with a multiplicity of sensors, each sensor of which converts at least part of the sitting weight into an electrical signal. The load cells are inserted in a region between the vehicle seat and the seat attachment sections of a vehicle bodywork. In addition to the weight of the vehicle occupant, the sitting weight measuring device can also determine the distribution of the weight of the vehicle occupant over the vehicle seat. With a knowledge of the weight and distribution of the weight, it is possible to actuate safety devices, in particular airbags and seatbelts, in such a way that optimum protection in terms of safety technology is ensured for the vehicle occupant.

Finally, German patent document DE 102 49 960 A1 discloses an OC (Occupant Classification) system which is based on the dependence between bodyweight and the distance between the hips of a seat occupant. For this suppose a so-called OC mat evaluates the pressure profile on the sitting area on the basis of its installation location in a vehicle seat and its physical method of operation. Analysis of the measured pressure profile permits an unoccupied or an occupied seat to be detected. When the seat is determined to be occupied, a distinction is then made between a person and a child's seat or similar object, based on the sitting profile of the person, or an impression which is typical of a specific object. When a person is detected, he or she is further classified with regard to various classes which correspond to the size of the body and to the bodyweight.

One object of the invention is to provide a method for operating an electrically adjustable vehicle seat which has at least one electrically adjustable upholstered seat element and a sitting weight measuring device for sensing the weight of a vehicle occupant sitting on the vehicle seat, and which senses the weight of the vehicle occupant with a high degree of measuring accuracy.

Another object of the invention is to provide a method for setting parameters for operating such a vehicle seat with a weight measuring system, which method provides an increased degree of safety relative to the prior art, in a driving mode, and particularly in a hazardous situation.

These and other objects and advantage are achieved by the method according to the invention, in which, for an initial sensing of the weight by the sitting weight measuring device, the upholstered seat element of the electrically adjustable vehicle seat is automatically moved into a measuring position. The vehicle seat in this instance has at least one electrically adjustable upholstered seat element which includes an inflatable air cushion, a seat cushion lowering means, a side support or thigh rest, and a sitting weight measuring device for sensing the weight of the vehicle occupant sitting on the vehicle seat. The adjustable upholstered seat element can be used, for example, to form a control for the hollow of the back, (such a seat being referred to in this configuration as a multi-contour seat), to implement a massage mode or to set the hardness of the seat.

Activated adjustable upholstered seat elements of the vehicle seat, which make available a so-called comfort function, can considerably influence the result of the sensing of the weight and falsify it. For example, the vehicle occupant's weight which is sensed with the sitting weight measuring device can be less than the actual weight of the vehicle occupant if parts of the body of the vehicle occupant are supported by the adjustable upholstered seat element so that the entire actual weight of the vehicle occupant is not sensed by the sitting weight measuring device. If actuation of the comfort function for the multi-contour seat is restricted during the sensing of the weight, more precise sensing of the weight can take place.

Preferably, in the measuring position, the upholstered seat element acts on the vehicle occupant to only a restricted degree, or not at all. That is, the comfort function for the vehicle seat is at least partially deactivated in this configuration. As a result, it is possible to sense reproducible values for the weight of the vehicle occupant which correspond to his or her actual weight. Subsequent adjustment of the upholstered seat element can take place on an individual basis, as a function of the actual weight of the vehicle occupant. As a result of the increased measuring accuracy for the sensing of the weight it is possible to increase considerably both the comfort and safety for the vehicle occupant. Furthermore, incorrect triggering of safety systems connected downstream (for example, an airbag system which is assigned to the vehicle seat) is thus very largely avoided.

The sitting weight measuring device can comprise, in particular, a sensor mat which can be integrated into the vehicle seat with a low degree of technical complexity. The sensor mat can contain, for example, resistive film pressure sensors. However, it is also possible to use other weight pickups for sensing the weight, for example load cells.

Preferably, initial weight sensing takes place within a provided time interval after the opening of a door of the motor vehicle (which is sensed by means of a door contact switch), or after occupation of the seat has been detected. As a result, early sensing of the weight is ensured and more wide ranging weight-dependent measures for increasing the comfort and the safety of the vehicle occupant can be initiated even before the journey starts.

In one configuration of the invention, an adjustment range of the electrically adjustable vehicle seat, or of the upholstered seat element, is predefined as a function of the current value of the sensing of the weight. (The electrically adjustable vehicle seat comprises at least one electrically adjustable upholstered seat element, an inflatable airbag, a seat cushion lowering means, a side support or a thigh rest, and the weight sensing system for sensing the weight of a vehicle occupant sitting on the vehicle seat.) The vehicle occupant is provided with an adjustment range for the upholstered seat element, which is suitable in terms of comfort and safety (for example in terms of medical and ergonomic criteria), which range is adapted individually to his currently sensed weight. The adjustable upholstered seat element may be used, for example, for forming a contour of the hollow of the back, for implementing a massage mode or for setting the hardness of the seat.

The sensing of the weight may be implemented, for example, by means of an Occupant Classification system or a sitting weight measuring system. For the purpose of restricting the adjustment range, indirectly measuring weight sensing systems (for example optical vehicle occupant sensing systems) which also permit conclusions to be drawn about the weight of the vehicle occupant, are also conceivable. A means of adjusting the upholstered seat element can be activated by the vehicle occupant or automatically, as can the comfort function.

In one refinement of the invention, the value range for weight sensing is divided into weight classes, and an individual adjustment range for the upholstered seat element is predefined for each weight class. It is possible, for example, to define a weight class for vehicle occupants with a high weight, a medium weight and a low weight, permitting persons to be classified and sorted according to their weight. A weight class comprises, for example, small children with a child's seat and children, and a further class comprises women with a low weight. The adjustment range of the upholstered seat element is adapted in an optimum way in terms of safety technology to each weight class. When control is carried out, a large group of vehicle occupants can thus be provided with the entire adjustment range of the upholstered seat element. The adjustment range, the so-called comfort range, is correspondingly limited for a small group of vehicle occupants which comprises, in particular vehicle occupants with a very low weight or a very high weight. In this context it is advantageous if a lower weight sensing threshold value above which the upholstered seat element can be adjusted is predefined.

Other objects, advantages and novel features of the present invention will become apparent from the following detailed description of the invention when considered in conjunction with the accompanying drawings.

DETAILED DESCRIPTION OF THE DRAWINGS

An electrically adjustable vehicle seat 1, which is embodies as a multi-contour seat in this exemplary embodiment, has, according to the figure, an electrically adjustable upholstered seat element 2 for setting a comfort function. The electrically adjustable upholstered seat element 2 is embodied as an inflatable seat cushion. The electrically adjustable upholstered seat element 2 can however also have different configurations.

Furthermore, a sitting weight measuring device 3 is provided for sensing or measuring the weight of a vehicle occupant sitting on the vehicle seat 1. The sitting weight measuring device 3 comprises in this exemplary embodiment a sensor mat. The sitting weight measuring device 3 actuates a control unit 4 by means of which the upholstered seat element 2 can be adjusted.

Figure 1:
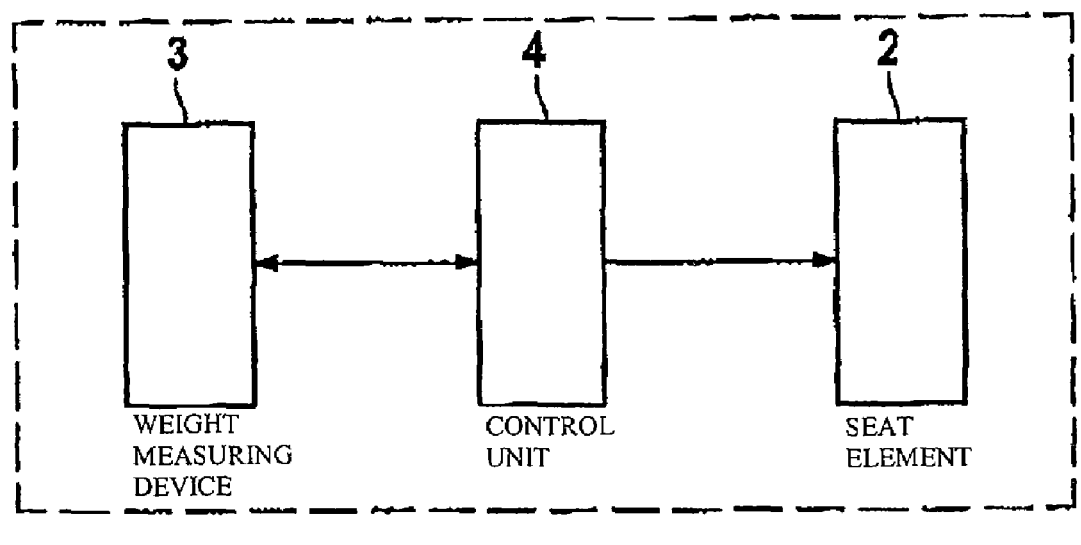
FIG. 1 shows schematically an electrically adjustable vehicle seat with a weight sensing system for actuating an electrically adjustable upholstered seat element of the vehicle seat.
Figure 2:
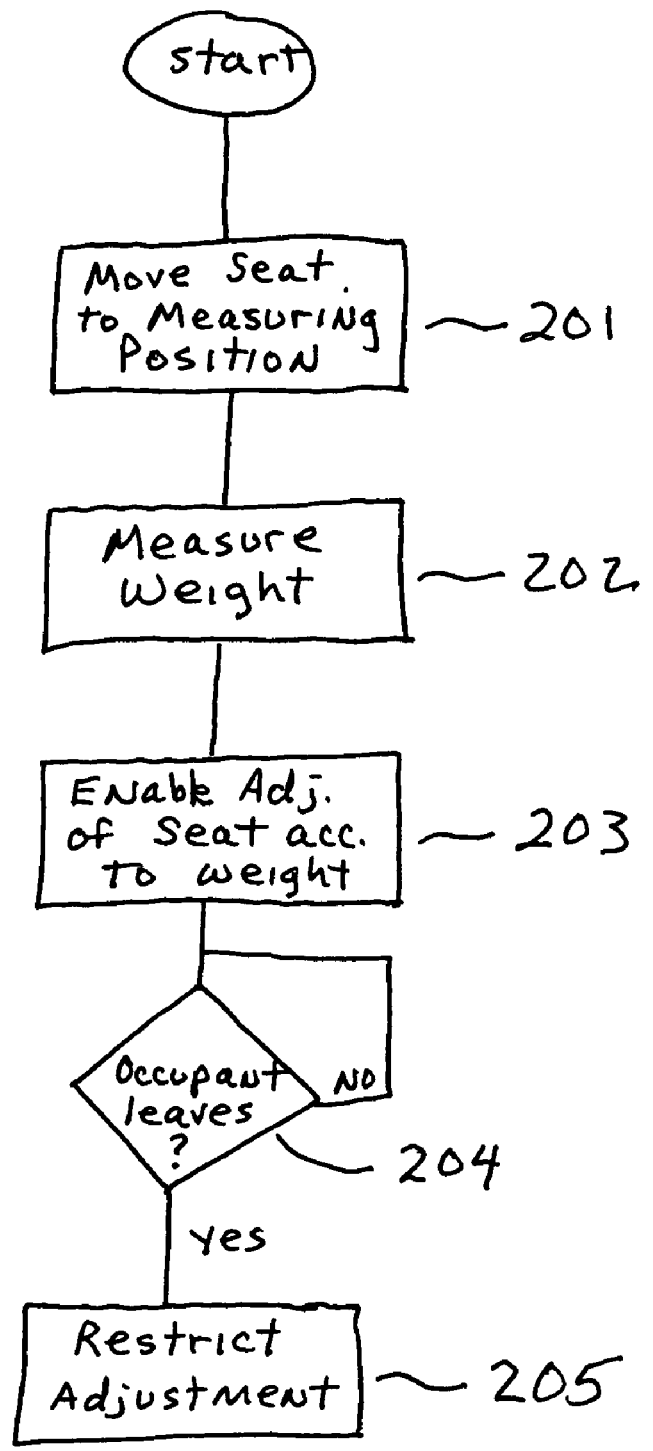
FIG. 2 is a flow diagram which illustrates the steps of the operating method according to the invention.

FIG. 2 is a flow chart which shows the steps for operating the electrically adjustable vehicle seat 1 according to the invention. For an initial sensing of the weight the sitting weight measuring device 3, in step 201 the upholstered seat element 2 is automatically moved into a measuring position in which the upholstered seat element 2 acts on the vehicle occupant only to a restricted degree. The actual weight of the vehicle occupant is therefore measured with a high degree of accuracy in step 202.

As noted previously, the weight measurement can be falsified by a completely actuated comfort function (for example, a seat cushion lowering means, a side support or a thigh rest, during the sensing of the weight) so that the actual weight of the vehicle occupant is no longer sensed. However, the electrically adjustable upholstered seat element 2 can be set in an optimum way for the vehicle occupant in terms of safety technology only with the correct value for the weight of the vehicle occupant. Accordingly, it is advantageous if the upholstered seat element 2 does not act at all on the vehicle occupant in the measuring position. In this configuration of the invention it is possible to sense the actual weight of the vehicle occupant most accurately in terms of measuring technology since a comfort function which acts on the vehicle occupant and which could influence the measurement result is no longer actuated. A maximum degree of safety for the vehicle occupant is ensured only if the actual weight of the vehicle occupant is known.

The initial sensing of the weight in step 202 takes place in this exemplary embodiment within a provided time interval after the opening of a door of the motor vehicle, which is sensed by means of a door contact switch. Alternatively, the initial weight sensing can be performed, for example, after the occupation of the seat has been detected.

After the weight has been sensed, the adjustment of the upholstered seat element 2 can be actuated, either automatically or by the vehicle occupant, as shown in step 203. For this purpose, it is possible to predefine an adjustment range of the upholstered seat element 2 as a function of the current value of the sensing of the weight. The adjustment range for the electrically adjustable upholstered seat element 2 is adapted here individually to the sensed weight of the vehicle occupant in terms of safety criteria and comfort features.

Alternatively, the value range for the sensing of the weight can be divided into weight classes, an individual adjustment range being predefined for the upholstered seat element 2 for each weight class. That is to say an adjustment range which is suitable for a weight class which is predefined for vehicle occupants and in which the electrically adjustable upholstered seat element 2, a so-called comfort function, can be adjusted, is defined for such weight class. It is advantageous here if a lower threshold value above which activation of the adjustment function of the upholstered seat element 2 is possible is predefined for the sensing of the weight.

After the vehicle occupant leaves the vehicle seat 1 (step 204) the comfort function for the vehicle seat 1 can be automatically restricted (step 205). The vehicle seat 1 is then already in a desired setting for renewed initial sensing of weight before a vehicle occupant accesses the motor vehicle again. In this embodiment, it is possible to dispense with adjusting the upholstered seat element 2 of the vehicle seat 1 directly before the actual sensing of the weight.

It is advantageous if, for initial sensing of the weight by means of the sitting weight measuring device 3, the upholstered seat element 2 is moved automatically into a measuring position in which the upholstered seat element 2 acts on the vehicle occupant only to a restricted degree or not at all. By means of this configuration of the invention, the weight of the vehicle occupant is measured with a high degree of accuracy. By means of a completely activated comfort function, for example a seat cushion lowering means, a seat support or a thigh rest, the result of the measurement of the weight may be falsified during the sensing of the weight so that the actual weight of the vehicle occupant is no longer sensed. Only the correct value of the weight of the vehicle occupant can be used to set the electrically adjustable upholstered seat element 2 for the vehicle occupant in a way which is optimum in terms of safety technology.

The method according to the invention for operating the electrically adjustable vehicle seat 1 ensures reliable sensing of weight, the actual weight of the vehicle occupant being determined with a high degree of accuracy. By reliably sensing weight, it is possible to provide the vehicle occupant both with a maximum level of safety and a maximum level of comfort.

Setting the vehicle seat 1, which may be a multicontour seat, ensures that a vehicle occupant is provided with a high degree of safety in road traffic since the adjustment range for the electrically adjustable upholstered seat element 2 is adapted individually to the currently sensed weight of the vehicle occupant. Furthermore, an additional degree of comfort is provided for the vehicle occupant.

The method can be implemented with only a low degree of expenditure since the weight sensing system 3, the electrically adjustable upholstered seat element 2 and the control unit 4 are already provided on a series production basis in the majority of motor vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an electrically adjustable vehicle seat which has at least one electrically adjustable seat element and a sitting weight measuring device for sensing a weight of a vehicle occupant sitting on the vehicle seat comprising:
    automatically moving the adjustable seat element of the electrically adjustable vehicle seat into a measuring position;
    sensing the weight by the sitting weight measuring device after the adjustable seat element of the electrically adjustable vehicle seat is automatically moved into the measuring position; and
    adjusting the adjustable seat element from the measuring position to a comfort position after the sensing step.

2. The method as claimed in claim 1, wherein in the measuring position the adjustable seat element acts on the vehicle occupant to one of a restricted degree and not at all.

3. The method as claimed in claim 1, wherein the sensing of the weight takes place within a predetermined time interval after opening of a door of the vehicle, which is sensed by means of a door contact switch.

4. The method as claimed in claim 1, wherein the sensing of the weight is carried out after occupation of the seat has been detected.

5. The method as claimed in claim 1, wherein the adjustable seat element comprises as an inflatable air cushion.

6. The method as claimed in claim 1, wherein the sitting weight measuring device comprises a sensor mat.

7. The method as claimed in claim 1, wherein the adjustable seat element can be adjusted by the vehicle occupant only after the weight has been sensed.

8. The method as claimed in claim 1, wherein an adjustment range of the adjustable seat element is predefined as a function of sensed weight value.

9. The method as claimed in claim 1, wherein:
    a value range for the sensing of the weight is divided into weight classes; and
    an individual adjustment range for the adjustable seat element is predefined for each weight class.

10. The method as claimed in claim 1, wherein a lower threshold value above which adjustment of the adjustable seat element is possible is predefined for the sensing of the weight.

11. A method for operating an electrically adjustable vehicle seat which has at least one electrically adjustable seat element and a weight sensing system for sensing a weight of a vehicle occupant sitting on the vehicle seat comprising:
    sensing the weight of the vehicle occupant sitting on the vehicle seat;
    defining an adjustment range of the adjustable seat element as a function of the sensed weight;
    restricting a movement of the adjustable seat element to a position located within the defined adjustment range; and
    moving the adjustable seat element to the position located within the defined adjustment range.

12. The method as claimed in claim 11, wherein:
    the adjustment range is divided into weight classes; and
    an individual adjustment range for the adjustable seat element is predefined for each weight class.

13. The method as claimed in claim 11, wherein:
    a lower weight sensing threshold value is predefined; and
    the adjustable seat element can be adjusted in the case of sensed weight values that exceed the lower weight sensing threshold.

14. The method as claimed in claim 11, wherein:
    the adjustable seat element can be adjusted by the vehicle occupant only after the weight has been sensed.

15. The method as claimed in claim 11, wherein the electrically adjustable seat element comprises an inflatable airbag.

16. The method as claimed in claim 11, wherein the weight sensing system comprises a sitting weight measuring device.

17. The method according to claim 16, wherein the sitting weight measuring device comprises a sensor mat.

18. The method as claimed in claim 11, wherein:
    the sensing of the weight occurs within a predefined time interval after a door of the vehicle is opened, which is sensed by means of a door contact switch.

19. The method as claimed in claim 11, wherein:
    the sensing of the weight is carried out after a seat occupation detection process has taken place.

20. A method of operating an adjustable vehicle seat having at least one adjustable seat element and a device for measuring a weight of a seat occupant comprising:
    reducing an effect of the at least one adjustable seat element on a measurement of the weight of the seat occupant by automatically moving the at least one adjustable seat element of the adjustable vehicle seat into a measuring position;

measuring the weight by a sitting weight measuring device after the adjustable seat element of the adjustable vehicle seat is automatically moved into the measuring position; and adjusting the at least one adjustable seat element from the measuring position to a comfort position after the measuring step.

21. The method according to claim 20, further comprising a step for limiting a permissible adjustment of said seat elements as a function of sensed weight of said seat occupant.

* * * * *